(12) United States Patent
Locke

(10) Patent No.: US 8,289,176 B2
(45) Date of Patent: Oct. 16, 2012

(54) RECESSED DETECTOR ASSEMBLY

(76) Inventor: Peter Joseph Locke, Kew Gardens, NY (US)

( * ) Notice: Subject to any disclaimer, the term of this patent is extended or adjusted under 35 U.S.C. 154(b) by 585 days.

(21) Appl. No.: 12/378,417

(22) Filed: Feb. 13, 2009

(65) Prior Publication Data

US 2010/0206048 A1    Aug. 19, 2010

(51) Int. Cl.
*G08B 17/10*    (2006.01)
(52) U.S. Cl. ........................................................ 340/628
(58) Field of Classification Search .................... 340/628
See application file for complete search history.

(56) References Cited

U.S. PATENT DOCUMENTS

| | | | | |
|---|---|---|---|---|
| 5,469,147 A * | 11/1995 | Trey et al. | ...................... | 340/628 |
| 6,166,648 A * | 12/2000 | Wiemeyer et al. | ............ | 340/630 |
| 6,940,410 B2 * | 9/2005 | Deacy | ........................... | 340/628 |
| 7,262,705 B2 * | 8/2007 | Back et al. | ..................... | 340/628 |
| 2004/0229113 A1 * | 11/2004 | Sharpe et al. | ................... | 429/98 |
| 2008/0272922 A1 * | 11/2008 | Spellman | ..................... | 340/628 |

* cited by examiner

*Primary Examiner* — Hezron E Williams
*Assistant Examiner* — Nathaniel Kolb
(74) *Attorney, Agent, or Firm* — Adams & Wilks

(57) ABSTRACT

A recess-mounted detector assembly has a housing configured to be recess mounted in a structure located in a preselected zone. The housing has an interior space configured to receive a detecting device operable to detect a condition in an airstream in the preselected zone. A cover removably attaches to the housing and has an aperture for allowing an airflow of air from the airstream in the preselected zone into the interior space of the housing. A base plate is mounted in the housing for undergoing pivotal movement between a first position, in which the base plate separates the interior space of the housing into a first compartment configured to receive the detecting device and a second compartment disposed between the open end of the housing and the base plate, and a second position in which the base plate is pivoted toward the open end of the housing to enable access to the first compartment from the open end of the housing.

13 Claims, 4 Drawing Sheets

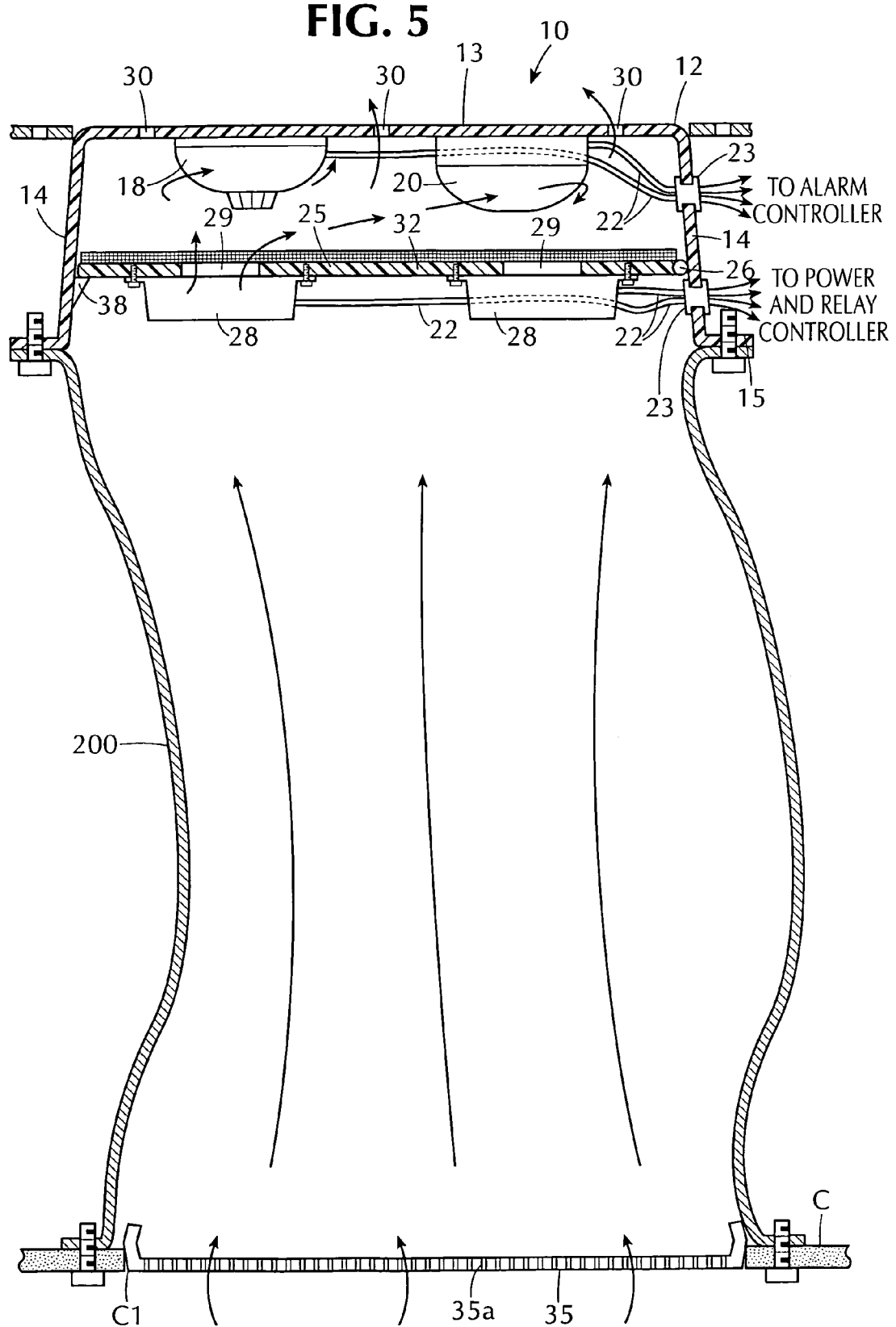

RECESSED DETECTOR ASSEMBLY

BACKGROUND OF THE INVENTION

1. Field of the Invention

The present invention relates generally to detector assemblies and, more specifically, to a recessed detector assembly for monitoring confined spaces, such as rooms of a building or home, and detecting the presence of smoke, heat, gas, fire and the like.

2. Background Information

There have been proposed various types of detector assemblies which are detachably received into a mounted base installed to a wall or ceiling surface. Such detector assemblies incorporate a detecting device such as a fire or smoke detector that is designed to send an electric alarm signal upon sensing a fire or smoke condition to a central control center through a signal line routed within the ceiling.

Detecting devices of this type are most commonly attached to inner surfaces of buildings such as walls and ceilings. Since smoke and hot air rise, the detecting devices are preferably matched to the ceiling. One type of such detecting devices is wired into a building's power supply in a non-interruptible connection. Another type of such detecting devices is battery powered and removably attached to the inner surface of the buildings to allow changing of the battery. Many present building codes require that the devices have dual power sources such as a hard wired connection and a battery for emergency power. In addition, several detectors per floor are required.

In modern construction, it is generally preferable from an aesthetic viewpoint that internal building surfaces be free of obstructions and protrusions. To accomplish this goal, recessed fixtures have been developed both for new construction and retrofitting. Such fixtures include recessed and indirect lighting appliances and recessed speakers.

Various assemblies have been proposed for installing a recessed detector device in a ceiling via a housing or junction box so that when installed, the detecting device is hidden from view. However, the structure of such existing assemblies imposes a severe limitation in that wiring operations for the detecting device cannot be done easily due to insufficient interior space afforded to the housing or junction box. As a result, installation and maintenance operations for such existing assemblies have been difficult, time consuming, and expensive to accomplish. Furthermore, such existing ceiling mounted detector assemblies have not been effective in providing adequate detection.

Accordingly, there is a long-standing need for a recessed detector assembly that provides effective and adequate detection of a fire or smoke condition, that is easy to install and maintain and that, when installed, is completely hidden from view and provides an aesthetic structural appearance.

SUMMARY OF THE INVENTION

It is an object of the present invention to provide a detector assembly that can be recessed in a ceiling, wall or other mounting surface in a building or other structure so that when installed, a cover for the recessed detector assembly is substantially flush with the surface and substantially completely conceals components of the recessed detector assembly so that the appearance of the mounting surface is aesthetically pleasing.

Another object of the present invention is to provide a recessed detector assembly which is simple in construction and is easy to install and use.

Another object of the present invention is to provide a recessed detector assembly that provides effective and adequate detection of a fire or smoke condition.

Another object of the present invention is to provide a recessed detector assembly that improves the detection sensitivity of one or more detection devices of the recessed detector assembly.

Another object of the present invention is to provide a recessed detector assembly that provides easy access to concealed components of the recessed detector assembly during installation and maintenance thereof.

Still another object of the present invention is to provide a recessed detector assembly that is adapted for use in a variety of locations.

Yet another object of the present invention is to provide a recessed detector assembly which is protected from vandalism and is substantially tamper-proof.

Yet another object of the present invention is to provide a recessed detector assembly which can be used with existing detecting devices for detecting various conditions (e.g., fire, smoke, gas) in the airstream.

The foregoing and other objects of the present invention are carried out by a recess-mounted detector assembly having a housing configured to be recess mounted in an opening of a structure located in a preselected zone. The housing has a base portion bounded by a sidewall portion to define an interior space having an open end. At least one detecting device is mounted in the interior space of the housing and is operable to detect a condition in an airstream in the preselected zone. A cover is configured for removable attachment at the opening of the structure and has at least one aperture therein for allowing an airflow of air from the airstream in the preselected zone into the interior space of the housing. At least one air inducing device is removably mounted in the interior space of the housing and is operable to induce the air flow in through the aperture of the cover from the preselected zone and into the interior space to allow the airflow to reach the detecting device to detect the condition in the airstream. A filter is preferably disposed between the detecting device and the air inducing device for filtering out impurities from the airflow reaching the detecting device to prevent a false detection by the detecting device of the condition in the airstream in the preselected zone.

The at least one air inducing device preferably comprises a pair of air inducing devices removably mounted in the interior space of the housing. One of the air inducing devices operates as a primary air inducing device to induce the air flow and the other of the air inducing devices operates as an auxiliary air inducing device operable to induce the air flow when the primary air inducing device becomes non-operational.

A base plate is pivotally connected to an inner surface of the sidewall portion of the housing. The base plate has a first main surface removably supporting the filter, a second main surface opposite the first main surface and removably supporting the air inducing unit, and an air opening extending from the first main surface to the second main surface and positioned between the filter and the air inducing unit so that the induced air flow passes through the air opening and the filter and reaches the detecting device.

In another embodiment, a flexible conduit is configured to be connected between the open end of the housing and the opening of the structure for transporting the air flow passing through the aperture of the cover to the interior space of the housing.

A recess-mounted detector assembly according to yet another embodiment has a housing configured to be recess-mounted in a recessed opening of a structure located in a preselected zone, the housing having a base portion bounded by a sidewall portion to define an interior space having an open end. At least one detecting device is removably mounted to an inside surface of the base portion of the housing for detecting a condition in an airstream in the preselected zone. A cover ring is removably attached to the open end of the housing. The cover ring has an aperture therein for allowing an airflow of air from the airstream in the preselected zone into the interior space of the housing. At least one air inducing device mounted in the interior space of the housing is operable to induce the air flow in through the aperture of the cover ring from the preselected zone and into the interior space to allow the airflow to reach the detecting device to detect the condition in the airstream. A filter is disposed between the detecting device and the air inducing device for filtering out impurities from the airflow reaching the detecting device to prevent a false detection by the detecting device of the condition in the airstream in the preselected zone.

A base plate is pivotally connected to the inside surface of the sidewall portion of the housing. The base plate has a first main surface removably supporting the filter, a second main surface opposite the first main surface, and a plurality of air openings extending from the first main surface to the second main surface for passage therethrough of the induced air flow to reach the detecting device. A plurality of mounting brackets are removably attached to an inside surface of the sidewall portion of the housing. The mounting brackets separate the interior space of the housing into a plurality of separate and independent compartments, with a first one of the compartments containing the air inducing device.

The base plate and the base portion of the housing form a compartment that is separate and independent from the plurality of compartments and that contains the detecting device and the filter. Optionally, a light device is disposed in a second one of the plurality of compartments and is removably attached to one of the mounting brackets disposed closer to the cover ring than the other of the plurality of mounting brackets.

Preferably, the at least one air inducing device comprises a pair of air inducing devices removably attached to different ones of the mounting brackets and disposed in different ones of the plurality of compartments not corresponding to the first compartment. One of the air inducing devices operates as a primary air inducing device to induce the air flow and the other of the air inducing devices operates as auxiliary air inducing device operable to induce the air flow when the primary air inducing device becomes non-operational. The detecting device and the pair of inducing devices are preferably aligned in a vertical direction of the housing.

BRIEF DESCRIPTION OF THE DRAWINGS

The foregoing summary, as well as the following detailed description of preferred embodiments of the invention, will be better understood when read in conjunction with the accompanying drawings. For the purpose of illustrating the invention, there is shown in the drawings embodiments which are presently preferred. It should be understood, however, that the invention is not limited to the precise arrangement and instrumentalities shown. In the drawings:

FIG. 5 is a partial sectional view of a recessed detector assembly according to a third embodiment of the present invention.

DETAILED DESCRIPTION OF THE PREFERRED EMBODIMENTS

Figure 1A:
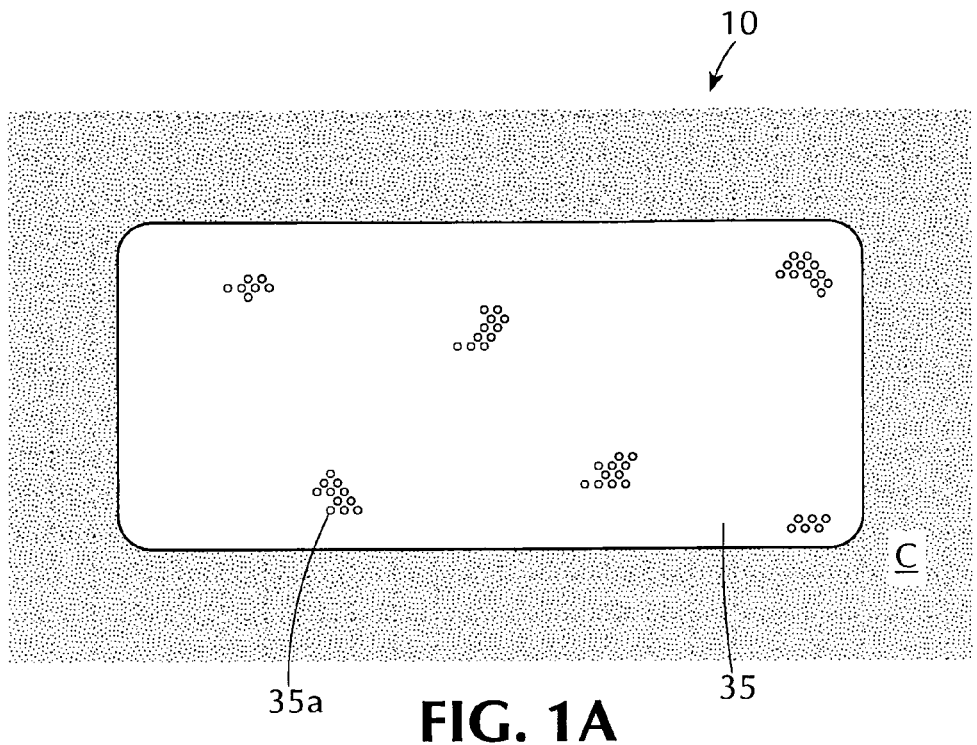
FIG. 1A is a front view of a recessed detector assembly according the present invention as it appears installed in a ceiling.

While this invention is susceptible of embodiments in many different forms, this specification and the accompanying drawings disclose only some forms as examples of the use of the invention. The invention is not intended to be limited to the embodiments so described, and the scope of the invention will be pointed out in the appended claims.

For the purposes of this application, the term "detecting device" means a device which detects one or more prescribed conditions of the atmosphere in the vicinity of the device, such as, without limitation, smoke, fire, heat, temperature, gases and particulate matter, and upon such detection produces a signal such as an audible and/or visual alarm. In some circumstances such a detecting device may also activate other equipment to extinguish the fire detected such as sprinklers or extinguishers. Common names of such detecting devices include smoke detector, fire alarm, thermal sensor, ionization detector, carbon monoxide detector, photoelectric detector, activator and the like.

It is understood that the recessed detector assembly of the present invention is adapted for use in a variety of locations and structures, including residential, commercial, and industrial buildings and transportation vehicles. For example, the recessed detector assembly is suitable for mounting to the fuselage of an aircraft for detecting a fire or smoke condition in the aircraft.

Although the recessed detector assembly of the present invention is shown and described mounted to a ceiling, it is understood that the recessed detector assembly can be mounted to other structures, including walls, columns and cabinets, and with various types of surfaces (e.g., flat and non-flat surfaces).

Certain terminology is used in the following description for convenience only and is not intended to be limiting. The words front, rear, upper, lower, behind, horizontal, and outwardly designate directions in the drawing to which reference is made. Such terminology includes the words above specifically mentioned and words of similar import.

Figure 1B:
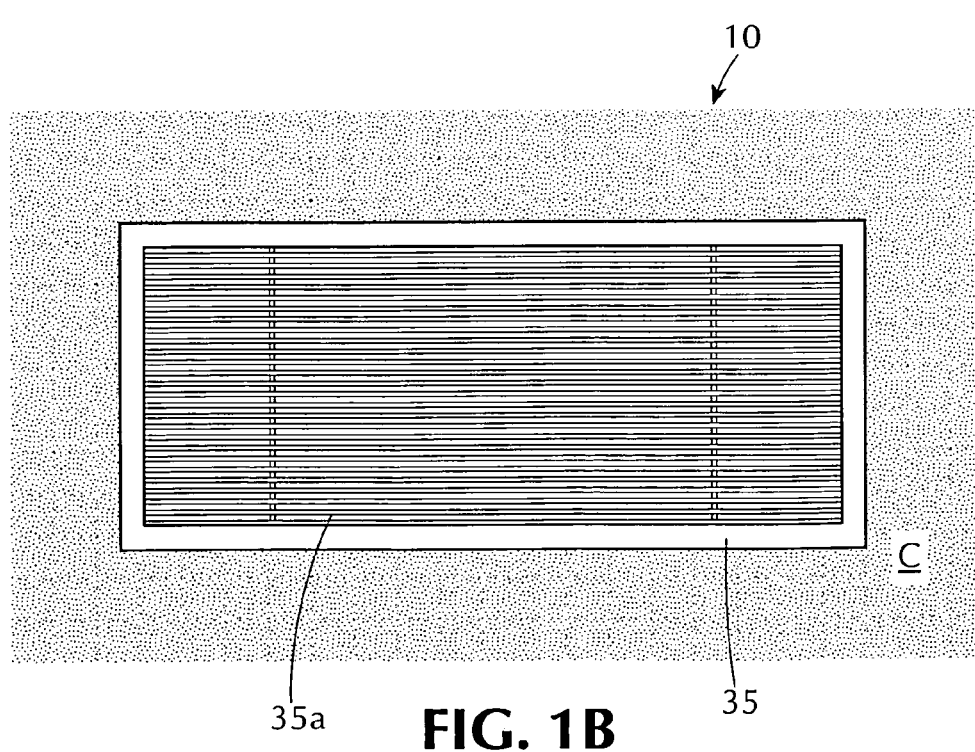
FIG. 1B is a front view of a modified version of the recessed detector assembly shown in FIG. 1A.

Referring now to the drawings in detail, wherein like numerals are used to indicate like elements throughout, there is shown in FIGS. 1A-1B and 2-5 embodiments of a recessed detector assembly, generally designated at 10, according to the present invention. FIGS. 1A-1B are front views of two examples of the recessed detector assembly 10 as they appear installed in a mounting surface, such as a ceiling C. It will be appreciated that, when installed in the ceiling C, the detector assembly 10 is completely hidden from view with the exception of a removable cover 35, provided with apertures or perforations 35a, which is substantially flush with the surface of the ceiling C and is intended to substantially completely conceal the remaining structure and other components of the detector assembly 10, including one or more detection devices that are mounted inside of the detector assembly as further described below. Because the detector assembly 10 is recessed, and the removable cover 35 is flush with the ceiling C, the appearance of the ceiling C is aesthetically pleasing.

Figure 2:
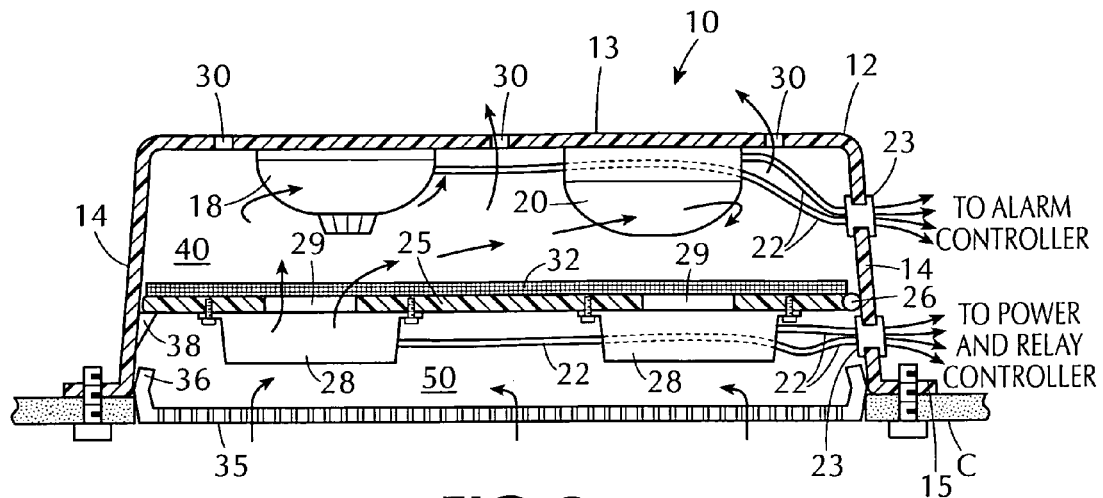
FIG. 2 is a partial sectional view of a recessed detector assembly according to a first embodiment of the present invention.
Figure 3:
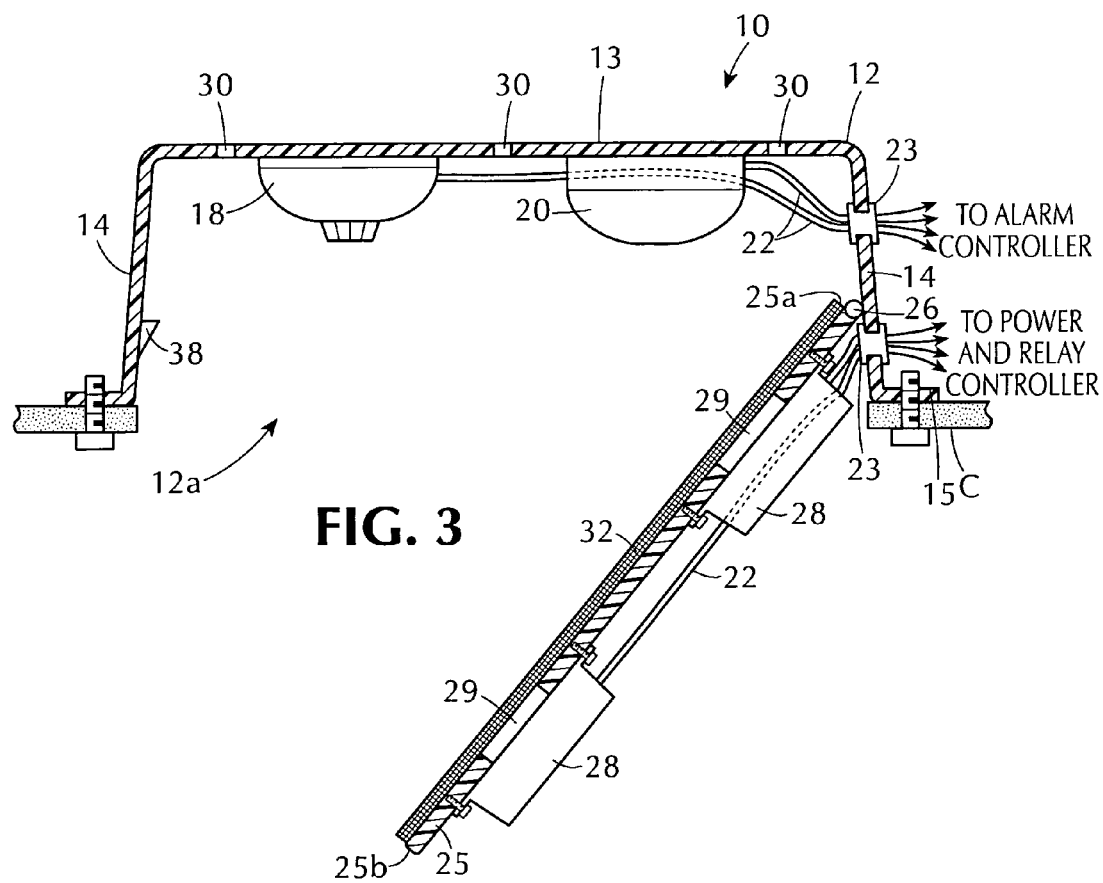
FIG. 3 is a partial sectional view of the recessed detector assembly shown in FIG. 2 with the grill removed and the base plate in a pivoted (open) condition.

A first embodiment of the detector assembly 10 according to the present invention is shown in FIGS. 2-3 which are sectional views of the detector assembly 10 installed in a ceiling C. FIG. 2 shows the state of the detector assembly 10 during use, and FIG. 3 shows a state of the detector assembly in which the cover 35 has been removed and a base plate 25 is pivoted downwardly, as further described below, to enable access to the interior of the detector assembly 10, such as during repair or maintenance of the detector assembly 10. It will be appreciated that the detector assembly 10 is configured to be installed in an opening in the ceiling C, rather than attached to the exterior surface of the ceiling C.

As shown in FIGS. 2-3, the detector assembly 10 comprises a housing or container 12 composed of plastic or other non-metallic material. The housing 12 has a closed rear (base) portion 13 bounded by a sidewall portion 14 that terminates at its front end in an outwardly extending flange 15 for attachment of the detector assembly 10 to the ceiling C. The front portion of the housing 12 is open. A movable support portion 38 is provided at the inner surface of the sidewall portion 14 (i.e., on the left side of the sidewall 14 as shown in FIGS. 2-3) for supporting a base plate 25 as further described below. The rear portion 13 and sidewall portion 14 form an interior space 12a of the housing 12.

Figure 4:
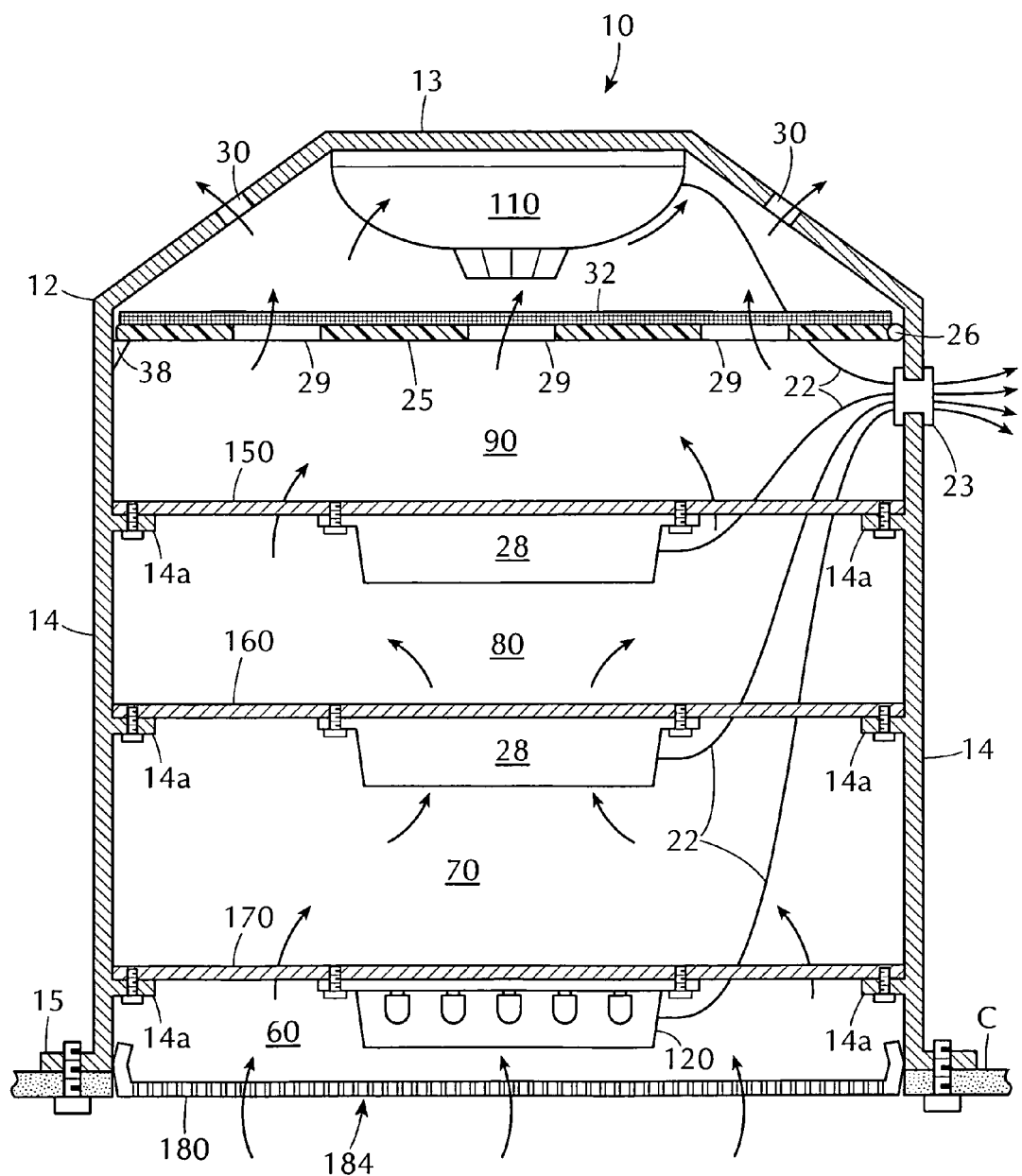
FIG. 4 is a partial sectional view of a recessed detector assembly according to a second embodiment of the present invention.

To the inside surface of the rear portion 13 are mounted two or more detecting devices, such as a smoke detector 18 and a heat detector 20. Though not shown, a gas detector (e.g., carbon monoxide detector), or a fire detector may also be mounted in the housing 12, or any combination of these or other detectors may be used. The detectors 18, 20, etc. are preferably removably mounted to the inside surface of the rear portion 13 so that they may be serviced, replaced or exchanged with other detectors. The smoke detector 18 and the heat detector 20 are hard-wired to a controller (not shown) through wiring 22 that extends through a grommet 23 in the sidewall portion 14 of the housing. Alternatively, a battery can be used to power the detectors or the battery can be provided for back up purposes. While two detectors 18, 20 are shown in this embodiment, it will be understood that number of detectors may be one (as shown in the embodiment of FIG. 4, for example) or more than two.

The base plate 25 is composed of plastic or other non-metallic material and has opposite first and second ends 25a, 25b. The base plate 25 is pivotally connected at the first end 25a to the inner surface of the sidewall portion 14 (i.e., the right sidewall portion 14 as shown in FIGS. 2-3) by means of a hinge 26 or the like. The second end 25b of the base plate 25 is configured to generally rest and be supported by the movable support portion 38 of the housing 12 so that the base plate is maintained in the position shown in FIG. 2. The sidewall portion 14 is provided with the support portion 38 which is preferably in the form of a cut-out that is bent inwardly to form a ledge on which the second end 25b of the base plate 25 rests.

To pivot the base plate 25 downwardly (i.e., to an open position) from its normal (i.e., closed) position shown in FIG. 2, the cut-out 38 is simply pushed outwardly so that the distal end of the base plate 25 clears the ledge. Similarly, to return the base plate 25 to its normal position, the base plate 25 is pivoted upwardly until the second end 25b thereof pushes the ledge outwardly, after which the cut-out 38 flexes inwardly to again engage the underside of the base plate 25. It will be appreciated that structures other than the cut-out 38 are suitable for supporting the second end 25b of the base plate 25 without departing from the spirit and scope of the invention.

The removable cover 35 is removably attached to the open front portion of the housing 12. The cover 35 is formed of plastic or other non-metallic material and is provided with the apertures or perforations 35a to permit the flow of air through the cover into the interior of the housing 12. By way of example, the cover may have an upstanding flexible annular rim 36 that can be snap-fit into the front opening of the housing 12. As shown in FIGS. 1A-1B and 2, when the cover 35 is mounted in place, it lies flush with the ceiling C thereby creating an aesthetically pleasing appearance. The cover 35 may have any desired shape and color to match the decor of the room. A grill-like cover or any other similar device is suitable as the cover 35, and the apertures or perforations 35a are dimensioned to keep foreign objects from entering the interior of the housing 12 while allowing the passage of air flow therethrough. FIG. 1A shows an example of the grill-like cover 35 in which the apertures 35a are circular-shaped. FIG. 1B shows another example of the grill-like cover 35 in which the apertures 35a are in the form of horizontal slits. Other forms of the apertures (e.g., vertical slits; non-circular apertures) are also suitable for the grill-like cover 35.

A pair of low-voltage fans 28, 28 are powered by respective fan motors (not shown) and are removably attached to the front face of the base plate 25 by screws 24 or the like. The base plate 25 is provided with air openings 29, 29 located behind the fans 28, 28, and the housing 12 is provided with air openings 30 in the rear portion 13. The fans 28, 28 are also hard-wired to the controller through wiring (not shown) for connection to an external source of electrical power (not shown). Preferably, a battery back-up power supply is provided for powering the fans 28, 28 (and the detectors) in the event of an electrical power failure. Alternatively, a battery can be used to power the fans instead of being hard-wired.

The fans 28, 28 are preferably low-volume fans capable of creating a flow of air (denoted by arrows in FIG. 2) through the housing 12 by pulling ambient air from the zone corresponding to the location of the ceiling C in which the detector assembly 10 is mounted and into the housing 12 via the apertures or perforations 35a of the cover 35 which functions as an air intake grill. Thus each of the fans 28 corresponds to a device defining means for inducing an air flow inwardly through the intake grill 35 into the housing 12. By mounting the detectors 18, 20 to the inner surface of the rear portion 13 of the housing 12 provided with the air openings 30, the airflow generated by the fans 28, 28 is directed toward the detectors 18, 20, thereby reducing the time required for the fans 28, 28 to detect combustion products, including hot fluids (e.g., gas, smoke).

Each of the fans 28, 28 is preferably coupled to a relay (not shown) which will shut-off the fan when at least one of the detectors is activated (e.g., triggering the activation of an audible alarm) by the detection of a corresponding combustion product. This will prevent circulation of the combustion product (e.g., gas, smoke) by the fan after detection by the detectors. Each of the fans 28, 28 is also preferably coupled to a flow sensor (not shown) which senses the presence of airflow through the housing 12 and thereby determines if an adequate flowrate is created by the fan. It will be appreciated that only one of the fans 28 is required to be driven to achieve the purpose and objectives of the invention described herein. The other of the fans 28 is an auxiliary fan which will be activated automatically by the controller should the driven fan become non-operational.

An air filter 32 is removably connected, such as by clips, to the rear face of the base plate 25. The purpose of the air filter 32 is to filter out impurities (e.g., non-smoke impurities) from the flow of air or airstream generated by the fans 28, 28 and entering the housing 12. The filtered impurities may be substances that provide a false detection of a specific combustion product (e.g., gas, smoke) to be detected by the detectors.

In a modification to the first embodiment, instead of connection to the base plate 25, the air filter 32 may be positioned so as to rest directly on an inside surface (i.e., the surface facing the interior of the housing 12) of the cover 35. In yet a further modification, a separate air filter 32 may be associated with each of the detectors, such as by mounting the air filters directly on air intake surfaces of the respective detectors. These modified configurations would also achieve filtering out of the impurities from the airstream prior to the airstream being detected by the detectors.

During use, the detectors 18 and 20 and the fans 28, 28 are electrically connected to the controller. One of the fans 28 is driven to gently draw air (denoted by arrows in FIG. 2) upwardly through the perforations 35a in the cover 35 into the housing 12 and through the air opening 29 to circulate around the detectors 18 and 20. The circulating air then exits the housing 12 through the air openings 30. Should an abnormal level of a combustion product (e.g., gas, smoke) be detected, the appropriate detector will be activated and an audible alarm generated. The controller will also notify a central office of the detected abnormality. Should the driven fan become non-operational, the other fan 28 will be activated automatically by the controller.

In order to service, replace or exchange the detectors 18 and 20, or to service or replace the fans 28, 28, the cover 35 is removed after which the base plate 25 is pivoted downwardly as described above and shown in FIG. 3. This enables ready access to the detectors 18 and 20. In addition, this enables the air filter 32 to be cleaned and/or replaced and enables ready access to the fans 28, 28.

It will be appreciated that the ready access to the detectors 18 and 20, fans 28, 28, and filter 32 described above is greatly facilitated by the compartmentalized structure of the detector assembly 10 of the present invention. More specifically, when in the normal (i.e., closed) position shown in FIG. 2, the base plate 25 divides the interior space 12a of the housing 12 into an upper (first) compartment 40 and a lower (second) compartment 50. The upper compartment 40 contains or houses the filter 32 and the detectors 18, 20. The lower compartment 50 contains or houses the fans 28, 28 and includes the open front portion of the housing 12 which is closed by the cover 35. By this compartmentalized construction, access to the interior space 12a of the detector assembly 10 is facilitated. For example, since the fans 28, 28 in the lower compartment 50 can be accessed by simply removing the cover 35 and without the necessity of pivoting the base plate 25, damage to the detectors 18, 20 is prevented when replacing or maintaining the fans 28, 28. Furthermore, access to the detectors 18, 20 in the upper compartment 40 is accomplished by simply pivoting the base plate 25 as described above.

FIG. 4 shows a second embodiment of the recessed detector assembly 10 according to the present invention that is configured to be installed (i.e., recessed) in an opening in a wall or ceiling C as described above for the first embodiment in FIGS. 2-3. The material and general structure of the housing 12 in the second embodiment is the same as described above for the first embodiment, with the same reference numerals being used to designate similar structure, and structural differences in the housing 12 and other components between the first and second embodiments are as set forth below.

In the second embodiment, the housing 12 has a compartmentalized construction with five compartments denoted with reference numerals 60-100, and is configured for supporting a single detector 110 which may be a smoke detector, a heat detector, a gas detector (e.g., carbon monoxide detector), a fire detector or the like as described above for the first embodiment. The detector 110 is mounted to the inside surface of the rear portion 13 of the housing 12. It is understood, however, that the housing 12 of the second embodiment may be configured to support two or more of these types of detectors. The detector assembly 10 of the second embodiment also includes an air filter 32, and two (first and second) low-voltage fans 28, 28 which are hard-wired to a controller (not shown) through wirings 22 that extend through a grommet 23 in the sidewall portion 14 of the housing 12. The construction and features of the filter 32 and fans 28, 28 are as described above for the recessed detector assembly 10 of the first embodiment.

In the second embodiment, the filter 32 is removably connected, such as by clips, to the rear face of a base plate 25 provided with air openings 29 and which otherwise has the same construction as the base plate 25 described above with respect to the first embodiment shown in FIGS. 2-3. The base plate 25 is also pivotally connected to the inner surface of the sidewall portion 14 of the housing 12 by means of a hinge 26 or the like and rests on a ledge 38 of the sidewall portion 14 as described above for the first embodiment of FIGS. 2-3.

The recessed detector assembly 10 of the second embodiment includes a low-voltage light unit 120, such as an LED light unit, that is mounted in the housing 12 forwardly (i.e., in a direction towards the front portion of the housing 12) of the fans 28, 28. The low-voltage light unit 120 is also hard-wired to the controller through wiring 22. It will be appreciated that the low-voltage light unit 120 is an optional feature for the recessed detector assembly 10 and that the purposes and advantages of the invention described herein are achieved with or without the incorporation of the low-voltage light unit 120.

The fans 28, 28 and light unit 120 are mounted in the housing 12 via mounting brackets 150, 160, 170 which are in the form of elongated mounting bars. The fans 28, 28 and the light unit 120 are removably attached to front faces of the mounting brackets 150-170, respectively, by screws or other removable fastener. In this embodiment, each of the mounting brackets 150, 160, 170 is removably connected to a seat or ledge 14a formed on the inner surface of the sidewall portion 14 by screws or the like. It is understood, however, that other forms of connection are suitable for removably connecting the mounting brackets 150, 160, 170 to the sidewall portion 14. For example, opposite end portions of each of the mounting brackets 150, 160, 170 may be clipped into respective holes formed in the sidewall portion 14. It is understood that the air filter 32 may be alternatively positioned so as to rest directly on the mounting bracket 170, or multiple air filters 32 may be positioned so as to rest on the respective mounting brackets 150-170. Likewise, a separate air filter 32 may be associated with each of the detectors, such as by mounting the air filters directly on air intake surfaces of the respective detectors, as described above with respect to the first embodiment of the detector assembly.

In the second embodiment shown in FIG. 4 only one mounting bracket is used to removably mount each of the fans 28, 28 and the light device 120 to the sidewall portion 14 of the housing 12. In a modification to the second embodiment, a second (i.e., an additional mounting bracket) mounting bracket is used to removably mount each of these components to the sidewall portion 14. More specifically, for each of these components, the second mounting bracket is connected to the sidewall portion 14 in spaced-apart, coplanar relation to the other corresponding mounting bracket. For example, in FIG. 4 the second mounting bracket for each component would be positioned directly behind (i.e., in the direction into the page of FIG. 4) the corresponding mounting bracket shown. The second mounting bracket for each of the components would be removably connected to a corresponding seat or ledge formed on the inner surface of the sidewall portion 14 in the same manner as shown in FIG. 4 for the mounting brackets 150, 160, 170.

A cover ring 180 is removably attached to the open front end of the housing 12. The cover ring is composed of plastic or other non-metallic material and, by way of example, has upstanding flexible portions 182 that can be snap-fit into the front opening of the housing 12. The cover ring 180 has an opening 184 which is disposed generally directly below the light device 120 when the cover ring 180 is attached to the housing 12 as shown in FIG. 4. Thus, when installed in an opening in a wall or ceiling, the cover ring 180 will substantially completely conceal (i.e., when viewing the installed recessed detector assembly directly into the opening 184 of the cover ring 180) the components (e.g., mounting brackets, fans, filter, detector) mounted inside of the housing 12, except for the light device 120 which is disposed generally directly above the opening 184 of the cover ring 180. Since generally only the light device 120 can be viewed through the opening 184 of the cover ring 180, the recessed detector assembly 10 creates the appearance of a light fixture. Furthermore, when the cover ring 180 is mounted in place, it lies flush with the ceiling or wall. It will be appreciated that this structural configuration creates an aesthetically pleasing appearance for the recessed detector assembly 10.

During use of the recessed detector assembly according to the second embodiment, the detector 110, the fans 28, 28, and the light device 120 are electrically connected to the controller. One of the fans 28 is driven to gently draw air (denoted by arrows in FIG. 4) upwardly through the opening 184 of the cover ring 180 into the housing, around the mounting brackets 150, 160, 170, through air openings 29 of the base plate 25 and through the filter 32 to circulate around the detector 110. The circulating air then exits the housing 12 through the air openings 30. Should an abnormal level of a combustion product (e.g., gas, smoke) be detected, the detector 110 will be activated and an audible alarm generated. The controller will also notify a central office of the detected abnormality. Should the driven fan become non-operational, the other fan 28 will be activated automatically by the controller.

In order to service, replace, exchange and/or clean the filter 32 and/or the detector 110, or to service or replace the fans 28, 28, the cover ring 180 is removed after which the mounting bracket 170 is disconnected from the sidewall portion 14 of the housing to provide access to the fan 28 directly above the light device 120. To access the other fan 28 and the base plate 25, the brackets 160 and 170 are sequentially disconnected from the sidewall portion 14. To access the filter 32, the base plate 25 is pivoted downwardly as described above and shown for the first embodiment of FIG. 3. This also enables ready access to the detector 110.

It will be appreciated that the ready access to the detector 110, filter 32 and fans 28, 28 described above is greatly facilitated by the compartmentalized structure of the detector assembly 10 according to the second embodiment. More specifically, when in the normal (i.e., closed) position shown in FIG. 4: the cover ring 180, mounting bracket 170 and sidewall portion 14 form the first compartment 60 containing the light device 120; the mounting brackets 160, 170 and sidewall portion 14 form the second compartment 70 containing the first fan 28; the mounting brackets 150, 160 and sidewall portion 14 form the third compartment 80 containing the second fan 28; the base plate 25, mounting bracket 150 and sidewall portion 14 form the fourth compartment 90; and the rear portion of the housing 13 and base plate 25 form the fifth compartment 100 containing the filter 32 and the detector 110. By this compartmentalized construction, access to the interior space 12a of the detector assembly 10 for maintenance and/or repair of the light device 120, fans 28, 28, filter 32 and detector 110 is facilitated.

FIG. 5 shows a third embodiment of the recessed detector assembly 10 according to the present invention that is configured to be installed (i.e., recessed) in an opening in a wall or ceiling C as described above for the first embodiment in FIGS. 2-3. All of the components of the recessed detector 10 in the third embodiment are the same as those described above for the first embodiment of FIGS. 2-3, except for the provision of a flexible duct or conduit 200 as described below.

In the third embodiment, the flexible conduit 200 of the recessed detector assembly 10, which is made of a plastic or other non-metallic material, is removably connected by screws or other removable fastener to the housing 12 and the ceiling C. More specifically, an upper portion of the conduit 200 is connected to the outwardly extending flange 15 of the ceiling C, and a lower portion of the conduit 200 is connected to the ceiling C. The cover 35 is snap-fit into an opening C1 of the ceiling C so that the conduit 200 extends between the cover 35 and the housing 12.

The recessed detector assembly 10 of the third embodiment is particularly adapted for use in locations which lack sufficient space directly near the opening of the wall or ceiling of the structure in which the detector assembly is to be mounted. With the conduit 200, this configuration permits detection of a condition (e.g., fire, smoke, etc.) in the airstream of a particular zone with limited space in the wall or ceiling while permitting the housing 12 with the detectors 18, 20 and fans 28, 28 to be mounted at a location in the ceiling or wall which can accommodate the same.

For example, the third embodiment of the recessed detector assembly is well adapted for installation to the fuselage above the ceiling of the passenger and/or cargo compartment of various types of aircraft. Due to the limited space in the ceiling of an aircraft fuselage, the housing 12 containing the fans 28, 28, filter 32, and detectors 18, 20 is mounted in the ceiling at a first location of the fuselage which can accommodate the housing 12. The cover 35 is mounted into an opening of the ceiling at a second location of the fuselage with limited space which corresponds to the zone for which detection of the condition of the airstream is desired. The conduit 200, which is connected between the housing 12 and the cover 35, provides a means for transporting air (e.g., denoted by arrows in FIG. 5) which is drawn by the fans 28, 28 upwardly through the openings 35a of the cover 35 (at the second location of the fuselage) into the housing 12 (at the first location of the fuselage). It will be appreciated that since the fans 28, 28 provide a means for inducing an air flow in through the intake grill 35 into the housing 12 via the conduit 200, there is no need to couple the housing and/or the conduit 200 to the aircraft vent system or the like for the purpose of directing a flow of air to the detectors 18, 20.

In a modification to the third embodiment, instead of connection to the base plate 25, the air filter 32 may be positioned so as to rest directly on an inside surface (i.e., the surface facing the interior of the housing 12) of the cover 35. In yet a further modification, a separate air filter 32 may be associated with each of the detectors, such as by mounting the air filters directly on air intake surfaces of the respective detectors. These modified configurations would also achieve filtering out of the impurities from the airstream prior to the airstream being detected by the detectors.

The remaining features and operation of the recessed detector assembly 10 according to the third embodiment are the same as described above for the first embodiment of FIGS. 2-3. It will be understood that the recessed detector assembly 10 according to the third embodiment is also adapted for use in connection with transportation devices other than aircraft, such as various types of spacecraft, trains, buses and other forms of transportation.

In each of the foregoing embodiments of the recessed detector assembly, the wirings of the detectors, fans and light unit extend from the interior of the housing through an opening formed in the sidewall portion of the housing via a grommet and are wired to the corresponding alarm, power and relay controllers. In a preferred modification to these embodiments, the grommet may be replaced with a splice box or the like that is mounted on the sidewall portion of the housing to facilitate connection (i.e., plug-in) and disconnection (i.e., to and from the corresponding alarm, power and relay controllers) of the detectors, fans and light unit from the interior of the housing. By way of example, the splice box may be in the form of a telephone-type plate mounted on the sidewall portion of the housing and provided with connection screws on opposite surfaces of the plate (i.e., the surfaces facing the respective interior and exterior of the housing) for connection thereto of the detector, fan and light unit wirings and wirings from the plate to the corresponding alarm, power and relay controllers. By this construction, the splice box allows for quick connection and disconnection of the detector, fan and light unit wirings (i.e., from the corresponding alarm, power and relay controllers) from the interior of the housing during installation and maintenance of the detector assembly.

It is understood that other forms of the splice box are suitable for achieving the quick connect and disconnect feature of the detector, fan and light unit wirings from the corresponding alarm, power and relay controllers. For example, instead of connection screws, the opposite surfaces of telephone-type plate may be provided with connection jacks, and the wirings for the detector, fan and light unit and the corresponding alarm, power and relay controllers may be provided with connection clips for quick connection/disconnection to the corresponding connection jacks of the plate. It is also understood that, in addition to or alternative to the splice box, and for the purpose of achieving the foregoing quick connect and disconnect feature, the ends of the wirings that connect to the corresponding detector, fan and light unit may also be provided with a quick connect/disconnect connector (e.g., pin, screw, or clip connector) so that these components may be quickly connected and disconnected from the corresponding alarm, power and relay controllers directly from these components and from the interior of the housing.

Thus the present invention provides a recessed detector assembly that can be recessed in a ceiling, wall or other mounting surface in a building, transportation vehicle, or other structure so that when installed, a cover for the recessed detector assembly is substantially flush with the mounting surface and substantially completely conceals components (e.g., detectors, filter, fans) of the recessed detector assembly so that the appearance of the mounting surface is aesthetically pleasing. The structure of the recessed detector assembly provides easy access to the concealed components during installation and maintenance thereof, such as the pivotal base plate that can be pivoted downwardly to enable access to the air filter and detector(s) (first-third embodiments) and the fans (first and third embodiments) for removal, maintenance and/or repair of the same.

The recessed detector assemblies of the present invention is simple in construction and is easy to install and use, can be used with existing detectors (e.g., smoke, gas, fire detectors), is adapted for use in a variety of locations (e.g., including locations with limited space), and provides effective and adequate detection of various conditions (e.g., fire, gas, smoke) in the airstream of the zone desired to be detected by the detectors.

Moreover, the recessed detector assemblies according to the present invention are substantially tamper-proof. In this regard, the recessed detector assemblies of the first (FIGS. 2-3) and third (FIG. 5) embodiments include the cover 35 as shown in FIG. 1A or 1B which substantially completely conceals the fans 28, 28 and detectors 18, 20 that may invite tampering (e.g., the cover 35 creates the appearance that the recessed detector assembly is only a ventilation duct). The recessed detector assembly of the second (FIG. 4) embodiment includes the cover ring 180 which also substantially completely conceals the fans 28, 28 and detector 110 that may invite tampering (e.g., the cover ring 180 only permits the light device 120 to be viewed, thereby creating the appearance that the recessed detector assembly is merely a light fixture, such as a high hat-type light fixture). Thus the recessed detector assemblies according to the present invention are substantially protected from vandalism.

From the foregoing description, it can be seen that the present invention comprises an improved recessed detector assembly. It will be appreciated by those skilled in the art that obvious changes can be made to the embodiments described in the foregoing description without departing from the broad inventive concept thereof. It is understood, therefore, that this invention is not limited to the particular embodiments disclosed, but is intended to cover all obvious modifications thereof which are within the scope and the spirit of the invention as defined by the appended claims.

I claim:

1. A recess-mounted detector assembly comprising:
a housing configured to be recess mounted in an opening formed in a surface of a structure located in a preselected zone, the housing having a base portion bounded by a sidewall portion to define an interior space having an open end and configured to receive at least one detecting device for detecting a prescribed condition in an airstream in the preselected zone;
a cover removably covering the opening of the structure, the cover having at least one aperture therein for allowing an airflow of air from the airstream in the preselected zone into the interior space of the housing; and
a base plate connected to an inner surface of the sidewall portion of the housing for undergoing pivotal movement between a first position, in which the base plate separates the interior space of the housing into a first compartment configured to receive the detecting device and a second compartment disposed between the open end of the housing and the base plate, and a second position in which the base plate is pivoted toward the open end of the housing to enable access to the first compartment from the open end of the housing, the base plate having a first main surface, a second main surface opposite the first main surface and configured to removably support within the second compartment an air inducing device operable to induce the air flow in through the aperture of the cover from the preselected zone and into the second compartment, and at least one air opening extending from the first main surface to the second main surface and positioned so that in the first position of the base plate, the induced air flow in the second compartment passes through the air opening and into the first compartment to allow the airflow to reach the detecting device to detect the condition in the airstream;

wherein the sidewall portion of the housing has a through-hole communicating the interior space to an exterior of the housing and through which electrical wiring is configured to extend for electrically connecting the air inducing device to an external source of electrical power so that the base plate is allowed to pivot from the first position to the second position without requiring disconnection of the electrical wiring from either the air inducing device or the external source of electrical power.

2. A recess-mounted detector assembly according to claim 1; further comprising means for filtering out impurities from the airflow reaching the detecting device to prevent a false detection by the detecting device of the condition in the airstream in the preselected zone.

3. A recess-mounted detector assembly according to claim 2; wherein the means for filtering comprises a filter supported by the base plate in the first position thereof so that the air flow in the second compartment induced by the air inducing device is filtered by the filter prior to reaching the detecting device.

4. A recess-mounted detector assembly according to claim 3; wherein the filter is supported on the first main surface of the base plate.

5. A recess-mounted detector assembly according to claim 1; further comprising a movable support portion provided at the inner surface of the sidewall portion of the housing for supporting the base plate in the first position thereof, the movable support portion being configured to undergo movement to allow the base plate to pivot from the first position to the second position thereof.

6. A recess-mounted detector assembly according to claim 5; further comprising a filter supported by the base plate in the first position thereof so that the air flow in the second compartment induced by the air inducing device is filtered by the filter prior to reaching the detecting device.

7. A recess-mounted detector assembly according to claim 5; wherein the filter is disposed in the first compartment in the first position of the base plate.

8. A recess-mounted detector assembly according to claim 1; wherein the cover is removably attached to the open end of the housing so that when the housing is recess mounted in the opening of the structure, the cover is substantially flush with the surface of the structure and substantially completely conceals the housing, base plate and corresponding detecting and air inducing devices.

9. A recess-mounted detector assembly according to claim 1; further comprising a flexible conduit configured to be connected between the open end of the housing and the opening of the structure for transporting the air flow passing through the aperture of the cover to the first compartment of the housing.

10. A recess-mounted detector assembly according to claim 9; wherein the cover is removably attached to the surface of the structure so that when the housing is recess mounted in the opening of the structure, the cover is substantially flush with the surface of the structure and substantially completely conceals the housing, base plate, flexible conduit and corresponding detecting and air inducing devices.

11. A recess-mounted detector assembly comprising:

a housing for recess mounting in an opening of a ceiling or a wall located in a preselected zone, the housing having an interior space and an open end for allowing air from an airstream in the preselected zone to enter the interior space of the housing, and the housing being configured to support in the interior space at least one detecting device for detecting a prescribed condition in the airstream in the preselected zone;

a base plate connected to an inner surface of the sidewall portion of the housing for undergoing pivotal movement between a first position, in which the base plate separates the interior space of the housing into a first compartment configured to receive the detecting device and a second compartment disposed between the open end of the housing and the base plate, and a second position in which the base plate is pivoted toward the open end of the housing to enable access to the first compartment from the open end of the housing, the base plate having at least one opening for allowing an airflow of air from the airstream in the preselected zone that enters into the interior space of the housing to enter the first compartment and reach the detecting device for detection of the prescribed condition in the airstream in the preselected zone; and a cover for removably covering the opening of the ceiling or wall into which the housing is recess mounted so as to be substantially flush with the ceiling or wall and to substantially completely conceal the housing, base plate and corresponding detecting device;

wherein the base plate is configured to removably support within the second compartment an air inducing device operable to induce the airflow of air from the airstream in through the aperture of the cover from the preselected zone, into the second compartment, through the opening of the base plate, and into first compartment of the housing; and wherein the sidewall portion of the housing has a through-hole communicating the interior space to an exterior of the housing and through which electrical wiring is configured to extend for electrically connecting the air inducing device to an external source of electrical power so that the base plate is allowed to pivot from the first position to the second position without requiring disconnection of the electrical wiring from either the air inducing device or the external source of electrical power.

12. A recess-mounted detector assembly according to claim 11; further comprising a filter supported by the base plate in the first position thereof for filtering out impurities from the airflow reaching the detecting device to prevent a false detection by the detecting device of, the condition in the airstream in the preselected zone.

13. A recess-mounted detector assembly according to claim 11; further comprising a flexible conduit for connection between the open end of the housing and the opening of the ceiling or wall for transporting the air flow passing through the aperture of the cover to the first compartment of the housing, the flexible conduit having a first end for connection to the ceiling or wall proximate to the opening thereof and a second end for connection to the open end of the housing.

* * * * *